Patented July 24, 1934

1,967,373

UNITED STATES PATENT OFFICE 1,967,373

AZO DYESTUFF

Gerhard Schrader, Opladen, and Albert Schmelzer and Fritz Ballauf, Cologne-Mulheim, Germany, assignors to General Aniline Works, Inc., New York, N. Y., a corporation of Delaware No Drawing. Application July 15, 1931, Serial No. 551,049. In Germany July 19, 1930

8 Claims. (Cl. 260—86)

The present invention relates to azo dyestuffs, more particularly it relates to azo dyestuffs which may be represented by the probable general formula:

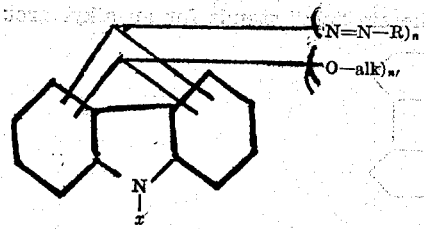

wherein "$x$" stands for hydrogen or an alkyl group, R stands for the radical of a coupling component of the aromatic-, carbazole-, acetoacetic arlyamide- and pyrazolone series, "$n$" stands for one of the numbers one and two, "alk" stands for an alkyl group, such as a methyl-, an ethyl- or a benzyl-group, and "$n$" stands for one of the numbers one and two.

Our new dyestuffs are obtainable by diazotizing in the usual manner an amino-alkoxy-carbazole and coupling in substance, on a substratum or on a fibre with a coupling component suitable for producing azo dyestuffs, such as 2.3-hydroxynaphthoic acid arylamides, pyrazolones, acetoacetic acid arylamides, phenols of the benzene or naphthalene series and their sulfonic acids, hydroxycarbazoles and the like.

Our new dyestuffs are generally dark, metallic lustrous powders, dyeing the cellulosic fibre generally violet to blue to black shades.

The starting amino-alkoxy-carbazoles are obtainable by nitrating the corresponding N-acetyl-alkoxy-carbazoles and reducing the nitro group or groups, the splitting off of the acetyl group simultaneously taking place in the reduction; this process of preparing the diazotization component is more fully described in our co-pending application for Letters Patent Serial No. 551,048, filed July 15, 1931, entitled: "New substituted alkoxy-carbazoles."

The invention is illustrated by the following examples, without being limited thereto:

Example 1.—Well boiled and dried cotton yarn is impregnated with a solution of 3.5 grams of 2-naphthol-3-carboxylic acid anilide, 6 ccs. of caustic soda lye (36° Bé.) and 6 ccs. of Turkey red oil per litre, wrung out and without being dried developed by means of a diazo solution containing 2.12 grams of 3-amino-2-methoxy carbazole per litre previously rendered acid to acetic acid by the addition of sodium acetate, rinsed and soaped. In this manner a beautiful blue is obtained. The dyestuff has the following formula:

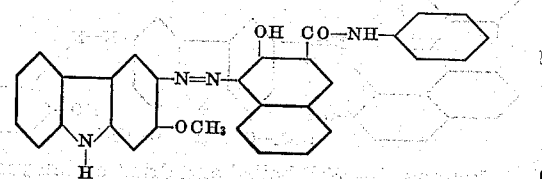

Example 2.—Well boiled cotton yarn is impregnated with a solution of 2.5 grams of 2.3-hydroxynaphthoic acid β-naphthylamide, 8 ccs. of Turkey red oil and 5 ccs. of caustic soda lye (36° Bé.) per litre and well wrung out. 24.0 parts by weight of 3-amino-2-ethoxy-9-methyl-carbazole (obtained by methylating 3-nitro-2-ethoxy-carbazole with dimethyl sulfate in alcoholic alkaline solution with subsequent reduction) are diazotized in a sufficient quantity of dilute hydrochloric acid with 7 parts by weight of sodium nitrite, and the diazo solution is diluted to a concentration of 1/100 mol per litre.

In this solution of diazotized 3-amino-2-ethoxy-9-methyl-carbazole neutralized with sodium acetate the grounded cotton yarn is developed. After rinsing and soaping, a blackish blue of very good fastness to boiling is obtained. The dyestuff corresponds to the following formula:

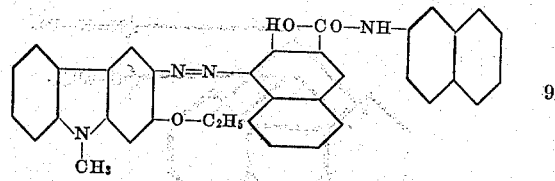

Example 3.—2,5 grams of 2.3-hydroxynaphthoic acid β-naphthylamide are made into a paste with 8 ccs. of Turkey red oil and 6 ccs. of aqueous caustic soda lye (36° Bé.), dissolved with hot water, and the solution is made up with water to one litre. 50 grams of cotton yarn are impregnated with this solution, wrung out and introduced into a diazo solution neutralized by the addition of sodium acetate and containing in a litre the diazonium compound from 2.12 grams of 6-amino-3-methoxy-carbazole for about 20 minutes, rinsed and soaped. In this manner a clear, bluish-violet is obtained. The dyestuff has the following formula:

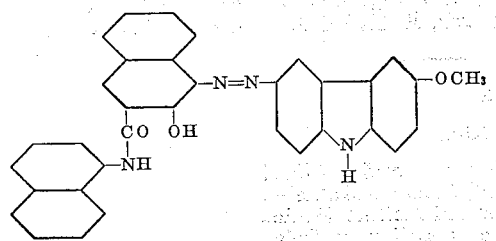

*Example 4.*—2,4 grame of 2-hydroxy-α-benzo-carbazole are made into a paste with 5 ccs. of caustic soda lye (36° Bé.), dissolved with hot water and the solution is made up with water to one litre. 50 grams of cotton yarn are impregnated with this solution, wrung out and introduced into a diazo solution neutralized by the addition of sodium acetate and containing in a litre 1,4 grams of 1.8-diethoxy-3.6-diaminocarbazole, rinsed and soaped. In this manner a dark, bluish-black is obtained. The dyestuff has the following formula:

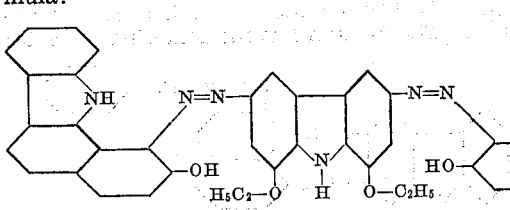

*Example 5.*—Well boiled and dried cotton yarn is impregnated with a solution containing per litre 2,9 grams of 2-hydroxyphenanthrene, 6 ccs. of Turkey red oil and 5 ccs. of causic soda lye (36° Bé.), and wrung out. Then the grounded cotton yarn is developed with a diazo solution containing in a litre 2,8 grams of 3-amino-2-hydroxy-carbazole-benzylether. After rinsing and soaping a strong, bluish-violet is obtained. The dyestuff corresponds to the following formula:

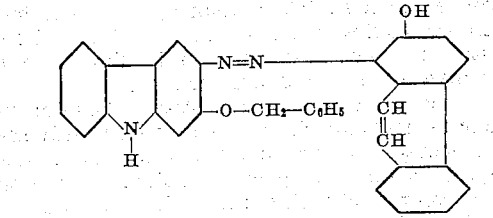

We claim:
1. Azo dyestuffs of the general formula:

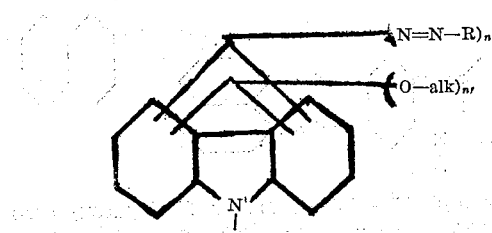

wherein "$x$" stands for hydrogen or an alkyl group, "alk" stands for an alkyl group, R stands for the radical of a coupling component of the aromatic-, carbazole-, acetoacetic arylamide-and pyrazolone series wherein "$n$" and "$n'$" stand for one of the numbers one and two, being generally dark, metallic lustrous powders and dyeing the cellulosic fibre generally violet to blue to black shades.

2. Azo dyestuffs of the general formula:

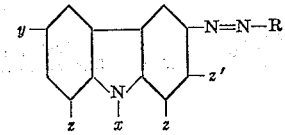

wherein "$x$" stands for hydrogen or an alkyl group, the "$z'$" and the characters "$z$" stand for hydrogen or alkoxy in such a manner that in case the characters "$z$" mean hydrogen "$z'$" means alkoxy and vice versa, R stands for the radical of a 2.3-hydroxynaphthoic acid arylamide, and "$y$" stands for hydrogen or —N=N—R, being generally dark, metallic lustrous powders and dyeing the cellulosic fibre generally blue to violet shades.

3. Azo dyestuffs of the general formula:

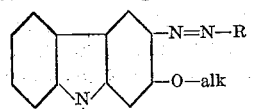

wherein "alk" stands for an alkyl group and R stands for the radical of a 2.3-hydroxynaphthoic acid arylamide, being generally dark, metallic lustrous powders and dyeing the cellulosic fibre generally blue to violet shades.

4. The azo dyestuff of the following formula:

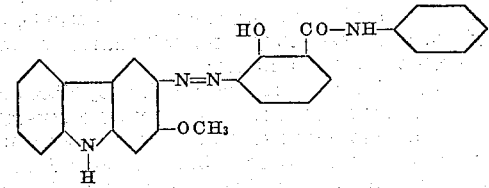

being a dark, metallic lustrous powder and dyeing the cellulosic fibre blue shades.

5. Azo dyestuffs of the general formula:

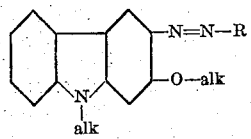

wherein "alk" stand for alkyl groups and R stands for the radical of a 2.3-hydroxynaphthoic acid arylamide, being generally dark, metallic lustrous powders, and dyeing the cellulosic fibre generally blue to violet shades.

6. The azo dyestuff of the following formula:

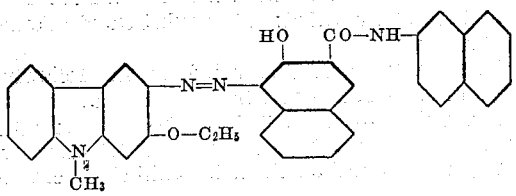

being a dark, metallic lustrous powder and dyeing the cellulosic fibre blackish-blue shades.

7. Azo dyestuffs of the general formula:

alk—O—[carbazole]—N=N—R wherein "alk" stands for an alkyl group and R stands for the radical of a 2.3-hydroxynaphthoic acid arylamide, being generally dark, metallic lustrous powders and dyeing the cellulosic fibre generally blue to violet shades.

8. The azo dyestuff of the following formula:

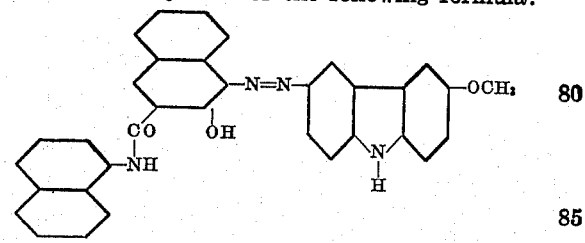

being a dark, metallic lustrous powder, and dyeing the cellulosic fibre bluish-violet shades.

GERHARD SCHRADER.
ALBERT SCHMELZER.
FRITZ BALLAUF.